(12) United States Patent
Jing

(10) Patent No.: US 10,611,096 B2
(45) Date of Patent: Apr. 7, 2020

(54) GLUE-INJECTION DEVICE AND LOCK-UP METHOD

(71) Applicant: HUIZHOU CHINA STAR OPTOELECTRONICS TECHNOLOGY CO., LTD., Huizhou, Guangdong (CN)

(72) Inventor: Xiaohong Jing, Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 93 days.

(21) Appl. No.: 15/952,622

(22) Filed: Apr. 13, 2018

(65) Prior Publication Data

US 2019/0202138 A1    Jul. 4, 2019

Related U.S. Application Data

(63) Continuation of application No. PCT/CN2018/073087, filed on Jan. 17, 2018.

(30) Foreign Application Priority Data

Dec. 28, 2017    (CN) .......................... 2017 1 1463892

(51) Int. Cl.
  *B29C 65/54*    (2006.01)
  *F16B 33/00*    (2006.01)
  (Continued)

(52) U.S. Cl.
  CPC ............. *B29C 65/542* (2013.01); *B05C 1/00* (2013.01); *F16B 5/02* (2013.01); *F16B 33/006* (2013.01); *B29L 2001/007* (2013.01)

(58) Field of Classification Search
  USPC .................................. 156/71, 574, 575, 578
  See application file for complete search history.

(56) References Cited

U.S. PATENT DOCUMENTS

| | | | |
|---|---|---|---|
| 5,518,145 A | 5/1996 | Chen | |
| 9,796,518 B2 * | 10/2017 | Ikushima | .......... B05C 17/00576 |
| 2011/0061809 A1 | 3/2011 | Michael et al. | |

FOREIGN PATENT DOCUMENTS

| | | |
|---|---|---|
| CN | 201399424 Y | 2/2010 |
| CN | 203525969 U | 4/2014 |

(Continued)

*Primary Examiner* — Sing P Chan
(74) *Attorney, Agent, or Firm* — Hemisphere Law, PLLC; Zhigang Ma

(57) ABSTRACT

The present disclosure provides a glue-injection device for locking a to-be-connected component, comprising a main part with a glue-injection tube, a cavity connected with the glue-injection tube being provided on one end surface of the main part, and a glue-injection head connected with the glue-injection tube being provided in the cavity and at a connection between the glue-injection tube and the cavity. The present disclosure further provides a method for performing the locking-up by the glue-injection device. In the glue-injection device and lock-up method, the lock-up is simple and efficient, and the connectors with different aperture diameters and directions can be locked-up, and the specification of the lock-up is uniform and the standardization is high, and the formed screw can be tightened and loosened by a wrench or screwdriver with existed standard.

19 Claims, 3 Drawing Sheets

(51) Int. Cl.
     *F16B 5/02*      (2006.01)
     *B05C 1/00*      (2006.01)
     *B29L 1/00*      (2006.01)

(56) References Cited

FOREIGN PATENT DOCUMENTS

| | | |
|---|---|---|
| CN | 103962278 A | 8/2014 |
| CN | 103963193 A | 8/2014 |
| DE | 1627771 A1 | 9/1970 |
| JP | 2004278302 A | 10/2004 |
| JP | 3812948 B2 | 8/2006 |

\* cited by examiner

GLUE-INJECTION DEVICE AND LOCK-UP METHOD

RELATED APPLICATIONS

The present application is a continuation application of PCT Patent Application No. PCT/CN2018/073087, filed Jan. 17, 2018, which claims the priority benefit of Chinese Patent Application No. 201711463892.9, filed Dec. 28, 2017, which is herein incorporated by reference in its entirety.

FIELD OF THE DISCLOSURE

The present disclosure relates to a field of automated assembly, and more specifically to a glue-injection device and a lock-up method.

BACKGROUND

Automated assembly is an assembly technique that uses an automated machinery instead of a manual labor.

During an assembly process, automated assembly can accomplish following types of operations: component transmission, positioning and connection; fixation to each other with a press or fastening screws, nuts; assembly size control and to ensure a quality of component connected or fixed; convey assembled parts or products and pack or stack them in a container. Among them, in a process of fixing the screws, a size of the screws is designed to be smaller and smaller due to a current slimness and structural requirements of narrow frame, so that a small screw-up can not be automatically locked due to a difficulty of grasping; at the same time, an existing automatic assembly process of locking-up the screws are limited to a vertical direction, but now for a side lock-up screw structure needs more and more; therefore, there is an urgent need for a device and a method capable of locking-up the screws of different sizes and locking-up the screws from different directions in order to improve a production efficiency.

SUMMARY

In view of shortcomings of the prior art, the present disclosure provides a glue-injection device and a locking-up method to meet a locking requirement of locking-up the screws of different sizes and locking-up the screws from different directions.

In order to realize an above purpose, the present disclosure adopts the following technical solutions:

The present disclosure provides a glue-injection device for locking a to-be-connected component, comprising a main part with a glue-injection tube, a cavity connected with the glue-injection tube being provided on one end surface of the main part, and a glue-injection head connected with the glue-injection tube and protruded in and toward the cavity being provided at a connection between the glue-injection tube and the cavity.

As one of the embodiments, the glue-injection head and the glue-injection tube are integrally formed, wherein the glue-injection head is a cylindrical shape, one end of a large circle is connected to an end surface of the glue-injection tube, and one end of a small circle is a glue outlet and disposed in the cavity.

As one of the embodiments, the main part comprises a first main part provided with the cavity and a second main part detachably connected with the first main part, and the glue-injection tube comprises a first glue-injection tube disposed in the first main part and a second glue-injection tube disposed in the second main part, and the first glue-injection tube and the second glue-injection tube connect with each other.

As one of the embodiments, the glue-injection head is detachably connected to the first glue-injection tube.

As one of the embodiments, an outer wall of the glue-injection head is provided with a screw thread, and a screw-thread hole is provided in the first glue-injection tube, and the glue-injection head is connected to the first glue-injection tube by the screw thread.

As one of the embodiments, the glue-injection head is a cross-shaped structure, and four corners of the cross-shaped structure respectively form four glue-injection channels.

As one of the embodiments, the cavity is a regular polygon cavity with a regular rule.

As one of the embodiments, the cavity is a regular hexagonal cavity.

The present disclosure further provides a lock-up method, in which a to-be-connected component is locked by the glue-injection device:

Injecting a fast-curing glue into the glue-injection tube;

Connecting each screw-thread hole on the to-be-connected component to be locked-up to form a screw-thread cavity, and connecting a glue outlet of the glue-injection head with a screw-thread cavity;

Squeezing the fast-curing glue in the glue-injection tube into the screw-thread cavity;

Screwing out from the main part after the fast-curing glue is full of the screw-thread cavity.

As one of the embodiments, a judgment of the fast-curing glue is full of the screw-thread cavity and the cavity is made based on the judgment: collecting a squeeze pressure when squeezing the glue-injection tube and monitoring an amount of a glue immediately; if a ratio of the squeeze pressure to the amount of the glue is greater than a preset value, stop injecting the glue and pull out the main part after the fast-curing glue solidifies.

The glue-injection device and the locking-up method of the disclosure have the advantages of simple lock-up and high efficiency, and can lock-up the connectors with different aperture diameters and different directions, and a specification of lock-up is uniform, a degree of standardization is high, a formation of the screw can be tightened or loosened by an existing standard wrench or screwdriver.

DETAILED DESCRIPTION OF PREFERRED EMBODIMENTS

In order to make the purposes, technical solutions and advantages of the present disclosure more comprehensible, the present disclosure is further described in detail below with reference to the accompanying figures and embodiments. It should be understood that the specific embodiments described herein are merely used to explain the present disclosure, and are not intended to limit the present disclosure.

Figure 1:
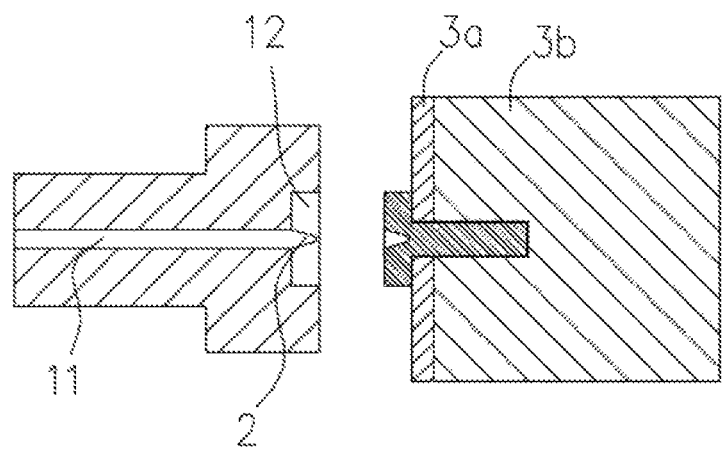
FIG. 1 is a schematic view of a glue-injection device according to the present disclosure.

See FIG. 1, a glue-injection device of the present disclosure is mainly used to lock two or more to-be-connected components (the to-be-connected components 3a and 3b in FIG. 1), and the glue-injection device comprises a main part 1, and a glue-injection tube 11 is provided on the main part 1, a cavity 12 connecting with the glue-injection tube 11 is provided on one end surface of the main part 1, a glue-injection head 2 which is connected with the glue-injection tube 11 and protruded toward the cavity is provided at a connection between the glue-injection tube 11 and the cavity 12. A glue in the glue-injection tube 11 of the glue-injection device is injected into a screw-thread hole of the to-be-connected component by squeezing the glue-injection head 2. After the glue is solidified, a connection of the to-be-connected component is realized, and it is not necessary to take screws and then lock-up a lock in the process of locking-up the devices, so it can be used to lock the to-be-connected components with a small screw-thread hole. The glue-injection device can be automatically controlled so that the screw-thread holes with different aperture diameters can be locked and requirement of locking-up screws with different sizes can be met by automatic sending without taking by hands, at the same time, because the device does not need to take the screws, it does not have to worry that the screws are not firmly take and fall in the process of taking the screws. Therefore, the to-be-connected components can be locked-up from different directions.

Specifically, the cavity 12 is used to form a screwing part which is the same as the cavity on a surface of the to-be-connected components after the glue is injected, and the screwing part corresponds to a screw head for turning a wrench to tighten or loosen a solidified screw formed by glue-injection. Wherein the cavity is a regular polygon cavity with a regular rule. In order to match with a standard wrench, the cavity 12 can be provided in any shape which is convenient to screw, wherein, see FIG. 2, the cavity 12 is a regular hexagonal cavity, and a hexagonal screw head is formed on the surface of the to-be-connected components which is easy to screw.

Figure 3:
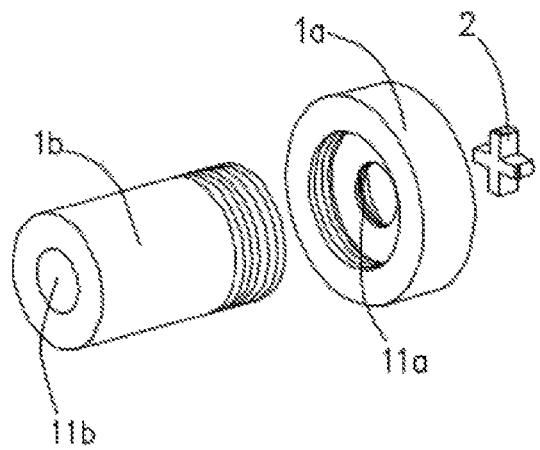
FIG. 3 is a schematic view of a connecting structure of a first main part and a second main part in a glue-injection device of the present disclosure.

Due to the variety of existing wrenches, in order to match the shapes of different wrenches and also for a diversification of the cavity 12, a part of the main part 1 provided with the cavity 12 can be designed as a detachable and convenient replacement form. Specifically, see FIG. 3, the main part 1 comprises a first main part 1a provided with the cavity 12 and a second main part 1b detachably connected with the first main part 1a, correspondingly. The glue-injection tube 11 comprises a first glue-injection tube 11a disposed in the first main part 1a and a second glue-injection tube 11b disposed in the second main part 1b, and the first glue-injection tube 11a and the second glue-injection tube 11b connect with each other.

Wherein, one end of the first main part 1a facing away from the cavity 12 is provided with an internal screw thread, and an external screw thread is provided at one end of the second main part 1b connected to the first main part 1a. The external screw thread on the second main part 1b is connected to the internal screw thread on the first main part 1a. During an automatic operation, the second main part 1b is usually fixed so that the first main part 1a with the cavity 12 can be detached, and the cavity 12 can be freely selected through a detaching and replacing of first main part 1a. Wherein, in this design, the first glue-injection tube 11a and the second glue-injection tube 11b are preferably coaxial and radius settings, so that the side walls of the two parts of the glue-injection tube are flush and tightly connected, which facilitates a flow of the glue in the glue-injection tube.

Figure 2:
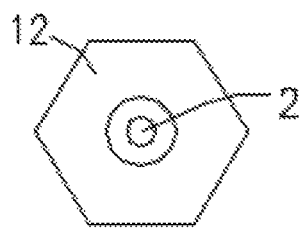
FIG. 2 is a schematic front view of a cavity in a glue-injection device of the present disclosure.

Wherein, as shown in FIG. 1 and FIG. 2, the glue-injection head 2 and the glue-injection tube 11 are integrally formed, wherein the glue-injection head 2 is a cylindrical shape. One end of a large circle of the glue-injection head 2 is connected to an end surface of the glue-injection tube 11, and one end of a small circle of the glue-injection head 2 is a glue outlet and disposed in the cavity 12. This kind of setting shortens a distance between the glue outlet and a screw-thread cavity of the to-be-connected components, so that the glue in the glue-injection tube can be sprayed into a deep part of the screw-thread cavity under a certain pressure to more fully fill the screw-thread cavity formed by a plurality of to-be-connected components, thereby reducing a generation of bubbles in the screw formed by glue-injection and making a connection more secure and reliable; at the same time, as the glue-injection head 2 is provided in the cavity 12, a cavity with the same shape of the glue-injection head 2 is formed on the screw head after the glue-injection is finished, and the screw formed by glue-injection can be easily unscrewed by using the cavity on the screw head.

Figure 4:
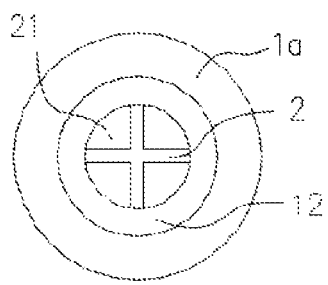
FIG. 4 is a schematic front view of a glue-injection head in a glue-injection device of the present disclosure.
Figure 5:
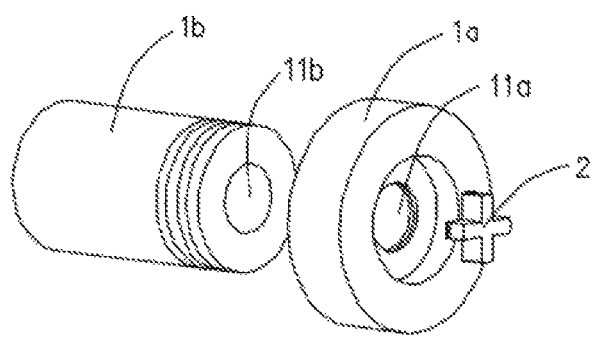
FIG. 5 is a schematic view of a connecting structure between a glue-injection head and a first main part in a glue-injection device of the present disclosure.
Figure 7:
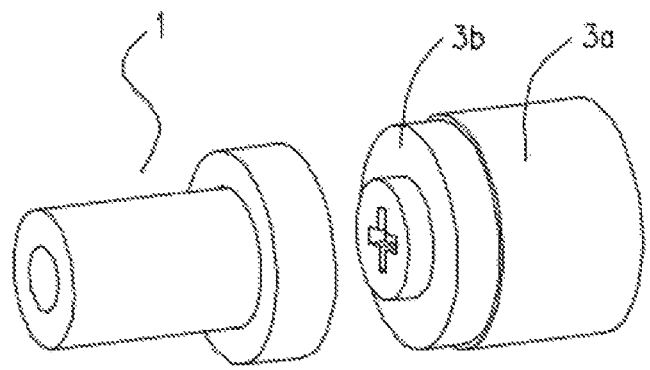
FIG. 7 is a schematic view of a glue-injection device after glue-injection is completed of the present disclosure.

Specifically, see FIG. 1, the cavity formed by the glue-injection head 2 partially extending into the cavity 12 can be used for matching a screwdriver to unscrew the screw formed by solidifying, wherein, the shape of the glue-injection head 2 is the same as the shape of the existing screwdriver head. Refer to FIG. 4 and FIG. 5, the glue-injection head 2 is a cross-shaped structure, and, after the glue-injection head 2 of the cross-shaped structure is connected to the glue-injection tube 11, four corners of the cross-shaped structure respectively form four glue-injection channels 21 (a cross shape is a solid structure, and four quadrant corners of the cross shape are empty, thus forming four glue-injection channels). The glue in the glue-injection tube 11 is injected into the screw-thread cavity of the to-be-connected components through the four glue-injection channels, see FIG. 7, and a cross-shaped groove is formed on the screw head of a formed glue-injection screw. The cross-shaped groove is used to match the screwdriver with a cross-shaped cutter head, so that the screw formed by the glue-injection can be tightened or loosened, and is convenient to use.

Figure 6:
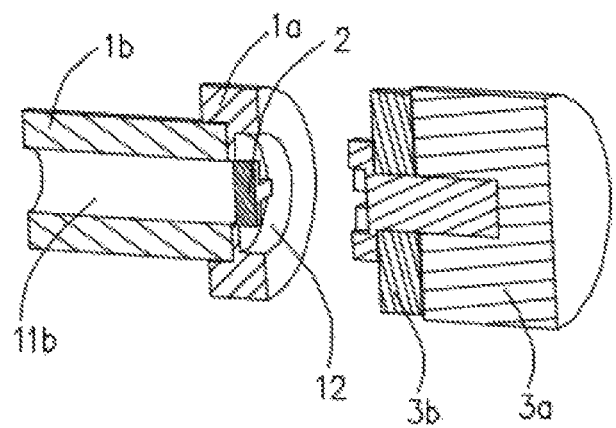
FIG. 6 is a cross-sectional view of a glue-injection device after glue-injection is completed of the present disclosure.

Specifically, in order to meet the screwdriver with different specifications in the existing standard, a detachable design of the glue-injection head 2 is applied to a glue-dispensing end of the glue-injection tube 11. Specifically, see FIG. 5 and FIG. 6, an outer wall of the glue-injection head 2 is provided with a screw thread, and a screw-thread hole is provided on the glue-dispensing end of the glue-injection tube 11, so that the screw thread of the glue-injection head 2 is connected to the screw thread of the glue-injection tube 11 to realize detachable and be convenient to replace the glue-injection head 2. It can be understood that when the main part 1 comprises the first main part 1*a* and the second main part 1*b* described above, the screw-thread hole in the glue-injection tube 11 is designed in the first glue-injection tube 11*a* of the first main part 1*a*, and the screw thread of the glue-injection head 2 and the screw-thread hole in the first glue-injection tube 11*a* matches and connects in order to realize conveniently detachable. It should be understood that after the glue-injection head 2 and the glue-injection tube 11 are connected, the glue-injection head 2 and the glue-injection tube 11 are connected with each other, and there are channels for allowing the glue in the rubber glue-injection tube 11 to flow out and enter the channel of the screw-thread cavity on the to-be-connected components.

Specifically, both the design of the cavity 12 and the glue-injection head 2 are for conveniently tightening or loosening the screws formed by glue-injection by matching with the wrench or the screwdriver; therefore, in a specific application process, the first main part 1*a* with the cavity 12 may be separately designed to be detachable, or the glue-injection head 2 may be separately designed to be detachable, and the two designs may also be used in combination, which are all within the protection scope of the present application.

Figure 8:
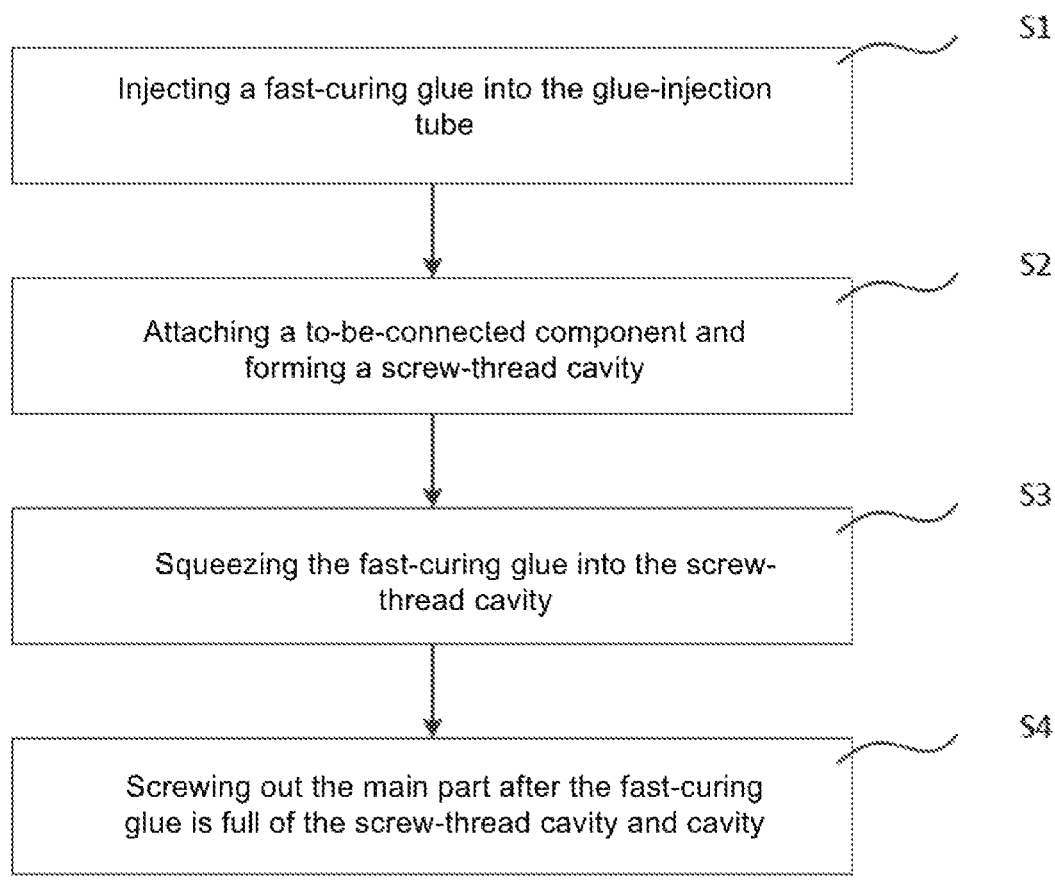
FIG. 8 is a flow chart of a lock-up method of the present disclosure.

See FIG. 8, the present disclosure also provides a method for performing lock-up using an above glue-injection device, comprising:

S1, injecting a fast-curing glue into the glue-injection tube 11;

S2, each screw-thread hole on the to-be-connected component 3*a*, 3*b* to be locked-up is connected to form a screw-thread cavity, and a glue outlet of the glue-injection head is connected with the screw-thread cavity;

S3, squeezing the fast-curing glue in the glue-injection tube 11 into the screw-thread cavity;

S4, pulling out the main part 1 after the screw-thread cavity and cavity 12 is full of the fast curing glue.

Wherein, the fast curing glue in S1 can be a thermosetting glue, an AB glue or any glue capable of meeting the requirements of a fast-curing process. It can be understood that, in the present application, there is no adhesion between the fast-curing glue and the glue-injection tube 11, the glue-injection head 2 and the cavity 13, so that the glue does not block the glue-injection tube 11 and the glue-injection head 2, thereby ensuring the natural flow of the glue. At the same time, the non-adhesion of the cavity 13 and the fast-curing glue makes the main part 1 to be pulled out smoothly after the glue-injection finished.

Specifically, before locking-up, each screw-thread hole on the to-be-connected components 3*a* and 3*b* to be connected are closely attached, wherein, in order to both facilitate the injection of the glue and remove the screw formed by the glue-injection, the screw-thread holes on the to-be-connected components are designed to be with the same aperture diameter of the hole. When the to-be connected components are going to be connected, the screw-thread holes are coaxially attached to form the screw-thread cavity, and the glue outlet channel of the glue-injection head 2 is aligned with the screw-thread cavity, and the outer end surface of the cavity 12 is closely attached to the outer end surface of the screw-thread cavity to facilitate the glue into the screw-thread cavity. Wherein, an adsorption component may be provided on the outer end surface of the cavity 12. The adsorption component and the end surface of the screw-thread cavity are closely attached, and the glue is discharged from a gap between the main part 1 and the end surface of the screw-thread cavity during the glue-injection process, and also ensures the appearance of the formed glue-injection screw.

In the process of S3, squeezing can be carried out manually or automatically, and the use of greater pressure to squeeze can make the glue spray into the deep part of the screw-thread cavity rapidly and powerfully, and make glue-injection screw to be fully filled such that high yield rate and high reliability of the connection can be achieved. Due to a constant filling of the fast-curing glue in a step, the fast-curing glue enters the cavity 12 to form the screw head on the surface of the to-be-connected components. In order to facilitate the formation of the screw head, a height of the glue-injection head 2 protruding into the cavity 12 is smaller than the height of the cavity 12, so that there is a certain distance between the end surface of the glue-injection head 2 and the end surface of the cavity 12, which facilitates the flow through which the glue flows into the cavity 12.

Specifically, after the glue is filled in the screw-thread cavity and filled in the cavity 12 in the process of S4 and the glue is solidified, the main part 1 is pulled away from the screw along an axial direction of the screw formed by the glue-injection to complete the glue-injection and lock-up of the to-be-connected components.

A judgment of the screw-thread cavity and the cavity being full of the fast curing glue is made based on following steps: collecting a squeeze pressure when squeezing the glue-injection tube and monitoring an amount of a glue immediately; if a ratio of the squeeze pressure to the amount of the glue is greater than a preset value, stop injecting the glue. After stopping injecting the glue, the fast-curing glue is determined to be solidified by acquiring a time when the glue-injection is stopped, taking the time when the glue-injection is stopped as a node, and determining the fast-curing glue is solidified when accumulation of the time after the node reaches a preset curing time.

Specifically, in order to meet different specifications of wrenches or screwdrivers, the side of the cavity 12 in the method may be designed as a detachable structure or the glue injection head 2 may be designed as the detachable structure or both, and the shape and structure of the specific cavity 12 and the shape and structure of the glue-injection head 2 refer to the glue-injection device described above.

The lock-up method of the present disclosure can be used for a continuous operation of the automatic control, and the connectors of the same process are arranged at intervals such that the glue-injecting device can perform a next lock-up directly after completing one lock-up. By applying this method, the lock-up is simple and efficient, and the connectors with different aperture diameters and directions can be locked-up. Therefore, the specification of the lock-up is uniform and the standardization is high, and the formed screw can be tightened and loosened by the existing standard wrench or screwdriver.

While specific embodiments of the disclosure have been described in detail, while some embodiments have been shown and described, it will be understood by those skilled in the art that various changes and modifications may be made without departing from the spirit and scope of the disclosure as defined by the appended claims and their equivalents, and these embodiments may be modified and improved, and these modifications and improvements should also fall within the protection scope of the present disclosure.

What is claimed is:

1. A glue-injection device for locking a to-be-connected component, comprising a main part with a glue-injection tube, a cavity connected with the glue-injection tube being provided on one end surface of the main part, and a glue-injection head connected with the glue-injection tube and protruded in and toward the cavity being provided at a connection between the glue-injection tube and the cavity, wherein, the glue-injection head is disposed in the cavity when the glue-injection head is connected with the glue-injection tube.

2. The glue-injection device according to claim 1, wherein the glue-injection head and the glue-injection tube are integrally formed, the glue-injection head is a cylindrical shape having a large circle at one end of the glue-injection head and a small circle at another end of the glue-injection head, the large circle is connected to an end surface of the glue-injection tube, and the small circle is a glue outlet and disposed in the cavity, wherein the large circle is larger than the small circle.

3. The glue-injection device according to claim 2, wherein the cavity is a regular polygon cavity with a regular rule.

4. The glue-injection device according to claim 3, wherein the cavity is a regular hexagonal cavity.

5. The glue-injection device according to claim 1, wherein the main part comprises a first main part provided with the cavity and a second main part detachably connected with the first main part, the glue-injection tube comprises a first glue-injection tube disposed in the first main part and a second glue-injection tube disposed in the second main part, and the first glue-injection tube and the second glue-injection tube connect with each other.

6. The glue-injection device according to claim 5, wherein the glue-injection head is detachably connected to the first glue-injection tube.

7. The glue-injection device according to claim 6, wherein an outer wall of the glue-injection head is provided with a screw thread, a screw-thread hole is provided in the first glue-injection tube, and the glue-injection head is connected to the first glue-injection tube by the screw thread.

8. The glue-injection device according to claim 7, wherein the glue-injection head is a cross-shaped structure, and four corners of the cross-shaped structure respectively form four glue-injection channels.

9. The glue-injection device according to claim 8, wherein the cavity is a regular polygon cavity with a regular rule.

10. The glue-injection device according to claim 9, wherein the cavity is a regular hexagonal cavity.

11. A lock-up method, in which a to-be-connected component is locked by a glue-injection device, the glue-injection device comprises a main part with a glue-injection tube, a cavity connected with the glue-injection tube being provided on one end surface of the main part, and a glue-injection head connected with the glue-injection tube and protruding in and toward the cavity being provided at a connection between the glue-injection tube and the cavity, wherein the glue-injection head is disposed in the cavity when the glue-injection head is connected with the glue-injection tube, and the lock-up method comprises:
  injecting a fast-curing glue into the glue-injection tube;
  connecting each screw-thread hole on the to-be-connected component to be locked-up to form a screw-thread cavity, and connecting a glue outlet of the glue-injection head with the screw-thread cavity;
  squeezing the fast-curing glue in the glue-injection tube into the screw-thread cavity;
  pulling out the main part after the screw-thread cavity and cavity is full of the fast curing glue.

12. The lock-up method according to claim 11, wherein the glue-injection head and the glue-injection tube are integrally formed, wherein the glue-injection head is a cylindrical shape having a large circle at one end of the glue-injection head and a small circle at another end of the glue-injection head, the large circle is connected to an end surface of the glue-injection tube, and the small circle is a glue outlet and disposed in the cavity, wherein the large circle is larger than the small circle.

13. The lock-up method according to claim 12, wherein the cavity is a regular polygon cavity with a regular rule.

14. The lock-up method according to claim 13, wherein the cavity is a regular hexagonal cavity.

15. The lock-up method according to claim 11, wherein the main part comprises a first main part provided with the cavity and a second main part detachably connected with the first main part, the glue-injection tube comprises a first glue-injection tube disposed in the first main part and a second glue-injection tube disposed in the second main part, and the first glue-injection tube and the second glue-injection tube connect with each other.

16. The lock-up method according to claim 15, wherein the glue-injection head is detachably connected to the first glue-injection tube.

17. The lock-up method according to claim 16, wherein, an outer wall of the glue-injection head is provided with a screw thread, the screw-thread hole is provided in the first glue-injection tube, and the glue-injection head is connected to the first glue-injection tube by the screw thread.

18. The lock-up method according to claim 17, wherein the glue-injection head is a cross-shaped structure, and four corners of the cross-shaped structure respectively form four glue-injection channels.

19. The lock-up method according to claim 11, wherein a judgment of the screw-thread cavity and the cavity being full of the fast curing glue is made based on: collecting a squeeze pressure when squeezing the glue-injection tube and monitoring an amount of a glue immediately if a ratio of the squeeze pressure to the amount of the glue is greater than a preset value, stop injecting the glue and pull out the main part after the fast-curing glue solidifies.

* * * * *